United States Patent [19]

Hirose

[11] Patent Number: 4,918,646
[45] Date of Patent: Apr. 17, 1990

[54] INFORMATION RETRIEVAL APPARATUS

[75] Inventor: Kenji Hirose, Yokohama, Japan

[73] Assignee: Kabushiki Kaisha Toshiba, Kawasaki, Japan

[21] Appl. No.: 88,156

[22] Filed: Aug. 21, 1987.

[30] Foreign Application Priority Data

Aug. 28, 1986 [JP] Japan .................................. 61-199915
Sep. 5, 1986 [JP] Japan .................................. 61-209064

[51] Int. Cl.⁴ .......................... G06F 7/06; G06F 3/14; G06F 15/40
[52] U.S. Cl. ................................ 364/900; 364/974.5; 364/974.4; 364/974.6
[58] Field of Search ... 364/200 MS File, 900 MS File

[56] References Cited

U.S. PATENT DOCUMENTS 4,318,184 3/1982 Millett et al. ......................... 364/900
4,574,364 3/1986 Tabata et al. ......................... 364/900

Primary Examiner—Gareth D. Shaw
Assistant Examiner—Christina M. Eakman
Attorney, Agent, or Firm—Finnegan, Henderson, Farabow, Garrett and Dunner

[57] ABSTRACT

To perform a binder through retrieval on binders which are set out on an optical disk and have different title structures, those binders containing the same key attribute data as a designated retrieval key are retrieved. When binders to be linked are selected from the retrieved binders, only those keys containing the same attribute data as the designated key are extracted from the selected binders. The extracted keys are sequentially arranged in the extracted order, thereby creating a title table for a link binder on a magnetic disk. This title table is retrieved to provide desired image imformation. Alternatively, a binder number/key correlation table is created on the magnetic disk, in accordance with the selection of the binders to be linked. This binder number/key correlation table includes the quantity of linked binders, the number of retrieval keys, the number of each binder and information relating to linked keys for each one of the linked binders. The title table of a binder associated with the designated key or keys, which is indicated by the binder number/key correlation table, is retrieved to provide the desired image information.

18 Claims, 8 Drawing Sheets

|   | Kq | | Tt |
|---|---|---|---|
| 4 | | | |
| 1 | EMPLOYEE NO. | NUMERAL | 10 |
| 2 | ADDRESS | CHARACTER | 20 |
| 3 | TEL. NO. | NUMERAL | 30 |
| 4 | NAME | CHARACTER | 40 |

Kn　　Kna　　　　Kt　　Kℓ

F I G. 2

Bna　　Bn　　Bi　　Tt　　Bt

| BINDER NAME | BINDER NO. | IDENTIFIER | TITLE STRUCTURE DEFINITION TABLE |
|---|---|---|---|
| | | | |
| | | | |
| | | | |

F I G. 3

| EMPLOYEE NO. | NAME |
|---|---|

K1 (top-left), K2 (top-right), B1, K1, K4, B2, K2, K1, B3

FIG. 8

| Bna | Bn | Bi | Tt | Bt |
|---|---|---|---|---|
| B1 | 0 | 0 | | |
| B2 | 1 | 0 | | |
| B3 | 2 | 0 | | |
| C | 3 | 1 | | |

FIG. 10

| Bk | Blq |
|---|---|
| 3 | |
| 2 | Kq |

| | | |
|---|---|---|
| 0 | K1 | K2 |
| 1 | K1 | K4 |
| 2 | K2 | K1 |

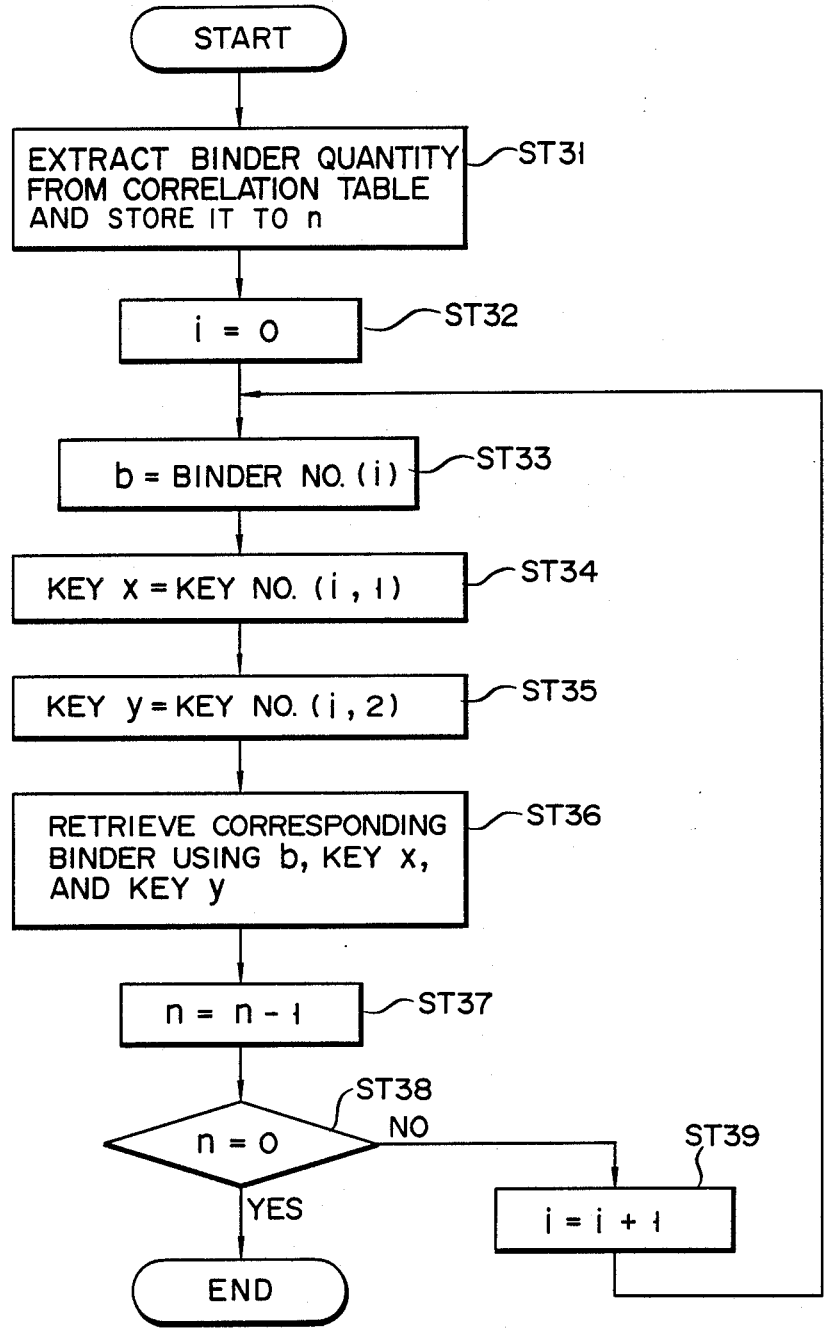
F I G. 12

INFORMATION RETRIEVAL APPARATUS

BACKGROUND OF THE INVENTION

The present invention relates to an information retrieval apparatus for retrieving information stored in an information storage medium.

Information retrieval apparatuses retrieve information—for example, image information—stored in an information storage medium, such as an optical disk. One side of the optical disk may be called, for example, a cabinet which can define a plurality, (for instance, eight) of binders (information groups). Each binder can store a plurality (e.g., 30,000) of files (storage regions), each of which constitutes a collection of image information. Each file is made up of one or more pages, a page being the minimum unit for image information stored in the optical disk.

To retrieve desired image information, using an image information retrieval apparatus, one of the binders of the optical disk is designated first, and then, the image information in the designated binder is retrieved. With this retrieval technique, however, when it is not known in which binder the desired image information is stored, the binders then have to be designated one by one until the desired image information is found. As a result, the retrieval operation can often take a considerable length of time.

As a solution to this problem, the so-called binder through retrieval method has been developed. Binder through retrieval is performed using a title structure which includes information such as a plurality of retrieval keys needed for image information retrieval and the length of each retrieval key. Such information is stored in advance in a management data memory—for example, a magnetic disk—for each binder. That is, binders with the same title structure are through-retrieved for the desired image information.

However, since this binder through retrieval technique enables retrieval of only those binders with the same defined title structure, a binder through retrieval cannot be executed properly if any item in the title structure, such as a retrieval key or the length of the key, differs between target binders.

SUMMARY OF THE INVENTION

With the above situation in mind, it is an object of this invention to provide an information retrieval apparatus which is capable of performing a binder through retrieval operation on binders with different title structures.

Another object of this invention is to provide an information retrieval apparatus by means of which the efficiency of the retrieval operation can be improved.

The above objects are achieved by the following information retrieval apparatus, which comprises:
means for storing information, the storage means defining a plurality of storage regions for storing information;
means for storing title structures for the storage regions, respectively, each of the title structures having a key which contains attribute data including the name of the key, wherein a title having the one of the title structures stored in the title structure storage means is added to the information stored in the each of the storage regions so as to be stored in the one of the storage regions;
means for designating a desired key of the title;
means for extracting, from the title structures for the storage regions, keys containing attribute data which are identical with the key designated by the designation means; and
means for retrieving information from the information storage means, by using the extracted keys.

BRIEF DESCRIPTION OF THE DRAWINGS

FIG. 2 is a diagram illustrating a title structure definition table;

FIG. 3 is a diagram depicting a binder table;

FIG. 8 is a diagram showing a title table of a link binder;

FIG. 10 is a diagram illustrating a binder table having a link binder registered therein, through by way of the operation shown in the flowchart of FIG. 9;

FIG. 11 is a diagram illustrating a binder number/key correlation table; and

FIG. 12 is a flowchart for explaining, in greater detail, the through retrieval operation outlined in the flowchart shown in FIG. 9.

DETAILED DESCRIPTION OF THE PREFERRED EMBODIMENTS

An embodiment of this invention will now be explained with reference to the accompanying drawings.

Figure 1:
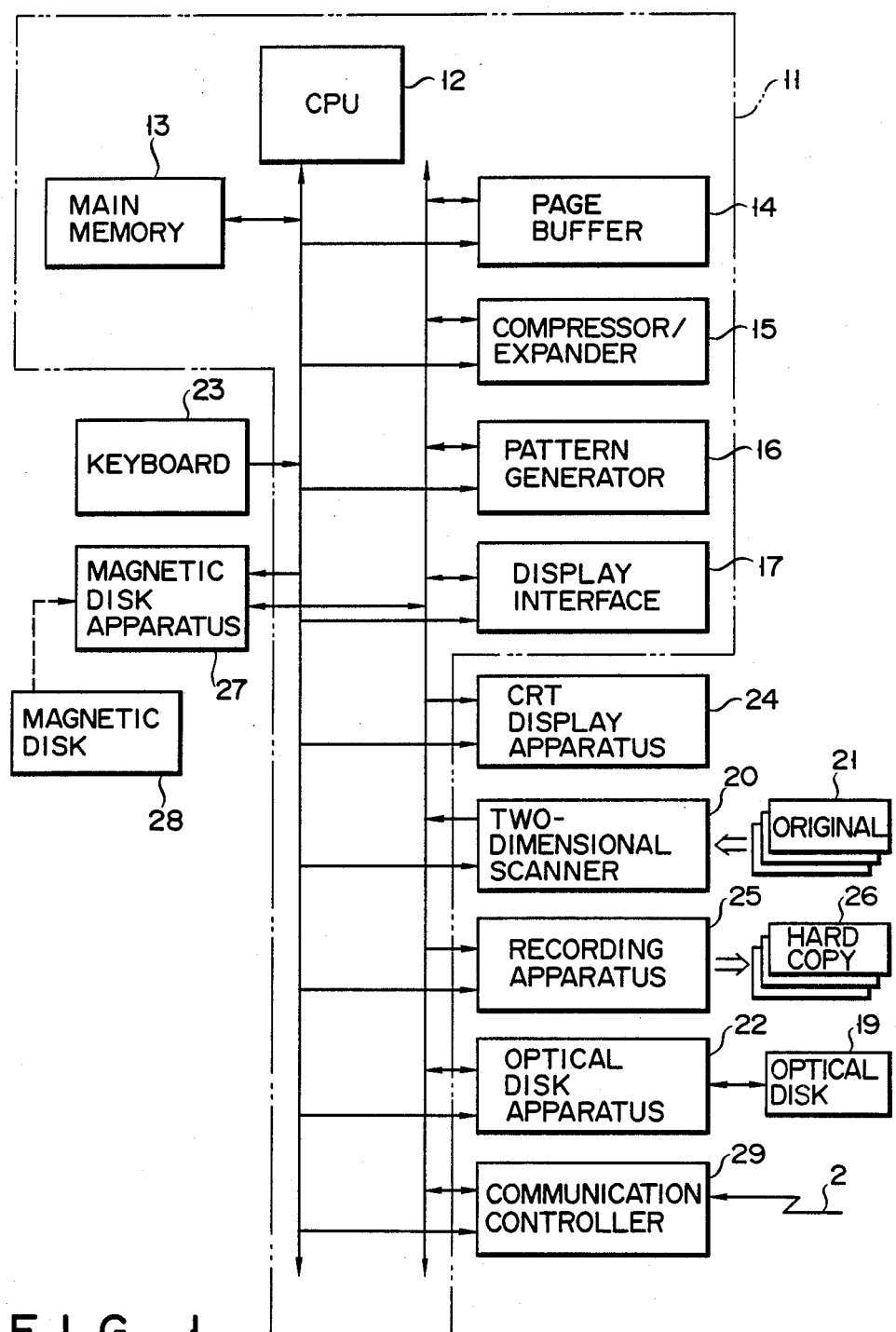
FIG. 1 is a block diagram showing an image information retrieval apparatus according to an embodiment of this invention.

FIG. 1 illustrates the arrangement of an image information retrieval apparatus. A main control apparatus 11 comprises a CPU 12 for executing various controls, a main memory 13, a page buffer (cache memory) 14 having a memory capacity of, for example, 512 Kb=128 blocks, a compressor/expander 15, a pattern generator 16 and a display interface 17. Compressor/expander 15 compresses image information (or reduces data redundancy) and expands the compressed information (or restores the redundancy of the original data). Pattern generator 16 has pattern information, such as characters and symbols, stored therein.

A two-dimensional scanner 20, which serves as a data reading apparatus, scans an original (e.g., a document) 21, for example, with a laser beam to provide an electric signal representing the image information on the original. An optical disk apparatus 22 receives, through main control apparatus 11, image information that has been scanned by two-dimensional scanner 20, and sequentially stores the image information onto an optical disk 19.

A keyboard 23 serves as an input device to enter various operation commands and specific retrieval codes associated with each item of image information. A cathode ray tube (CRT) display apparatus 24 displays image information that is supplied thereto through main control apparatus 11 after being scanned by two-dimensional scanner 20 or image information that is read out from optical disk apparatus 22 and supplied through main control apparatus 11. CRT display apparatus 24 and display interface 17 form a so-called image information display apparatus.

A recording apparatus 25 is a printer, for example, which provides a hard copy 26 of image information that is supplied through main control apparatus 11 from two-dimensional scanner 20 or from optical disk apparatus 22. A magnetic disk apparatus 27 is equipped with a magnetic disk 28, e.g., a hard disk. Magnetic disk 28 stores a title table that includes retrieval titles associated with image information. The retrieval titles serve as retrieval codes and are entered through keyboard 23.

A communication controller 29 is coupled to an external device through a communication line 2. This communication controller 29 transmits a request of retrieval data, such as an image information retrieval request signal and a retrieval code, to the external device, and receives retrieval data requested by the external device and supplies it to main control apparatus 11.

One side of optical disk 19 is called, for example, a cabinet, which can define a plurality of binders, e.g., eight binders. Each binder can store a plurality of files (e.g., 30,000 files), each of which is a collection of image information. Each file is made up of one or more pages, the page being the minimum unit for image information that is stored in optical disk 19.

Title structures for each binder are stored into magnetic disk 28, each title structure including information such as a plurality of retrieval keys needed for image information retrieval and the length of each retrieval key.

FIG. 2 illustrates an example of a title structure definition table Tt of the title structure that is assigned for each binder of optical disk 19. The aforementioned title structure is defined by the following fields: a key quantity Kq, key number Kn, key name Kna, key type Kt, and key length Kl. These fields are entered on keyboard 23, while viewing the display screen on CRT display apparatus 24.

That is, for the key quantity Kq, designation is made as to how many retrieval keys are present. For example, "4" is designated in FIG. 2. Then, for the key number Kn, the first available retrieval key number is designated. For example, "1" is designated in FIG. 2. Then the key name Kna for the key number is input. In this case, it is preferable to employ, as the key name, a name whose meaning is well understood at the time of retrieval. For example, "EMPLOYEE NO." is input (see FIG. 2). Then designation is made as to whether the contents of the corresponding key is a numeral or a character for the key type Kt. In FIG. 2, for example, "NUMERAL" is designated for the key number 1. If in this case "NUMERAL" and "CHARACTER" are designated as "1" and "2", respectively, it is only necessary that "1" or "2" be input on keyboard 23. In this way it is possible to improve designation efficiency. For the key length Kl, the number of digits of the corresponding key is entered. In FIG. 2, for example, "10" is entered.

In this way, the title structure containing four retrieval keys is defined as shown in FIG. 2.

Title structure definition table Tt is registered in a binder table Bt stored in magnetic disk 28, as is shown in FIG. 3. The binder table Bt further stores a binder name Bna, a binder number Bn, and a binder identifier Bi. Binder identifier Bi indicates whether a binder is a linked binder that is linked with another binder according to this invention, as described later. Binder identifier Bi is 1 when the binder is linked with another binder and is 0 when it is not so.

Figure 4:
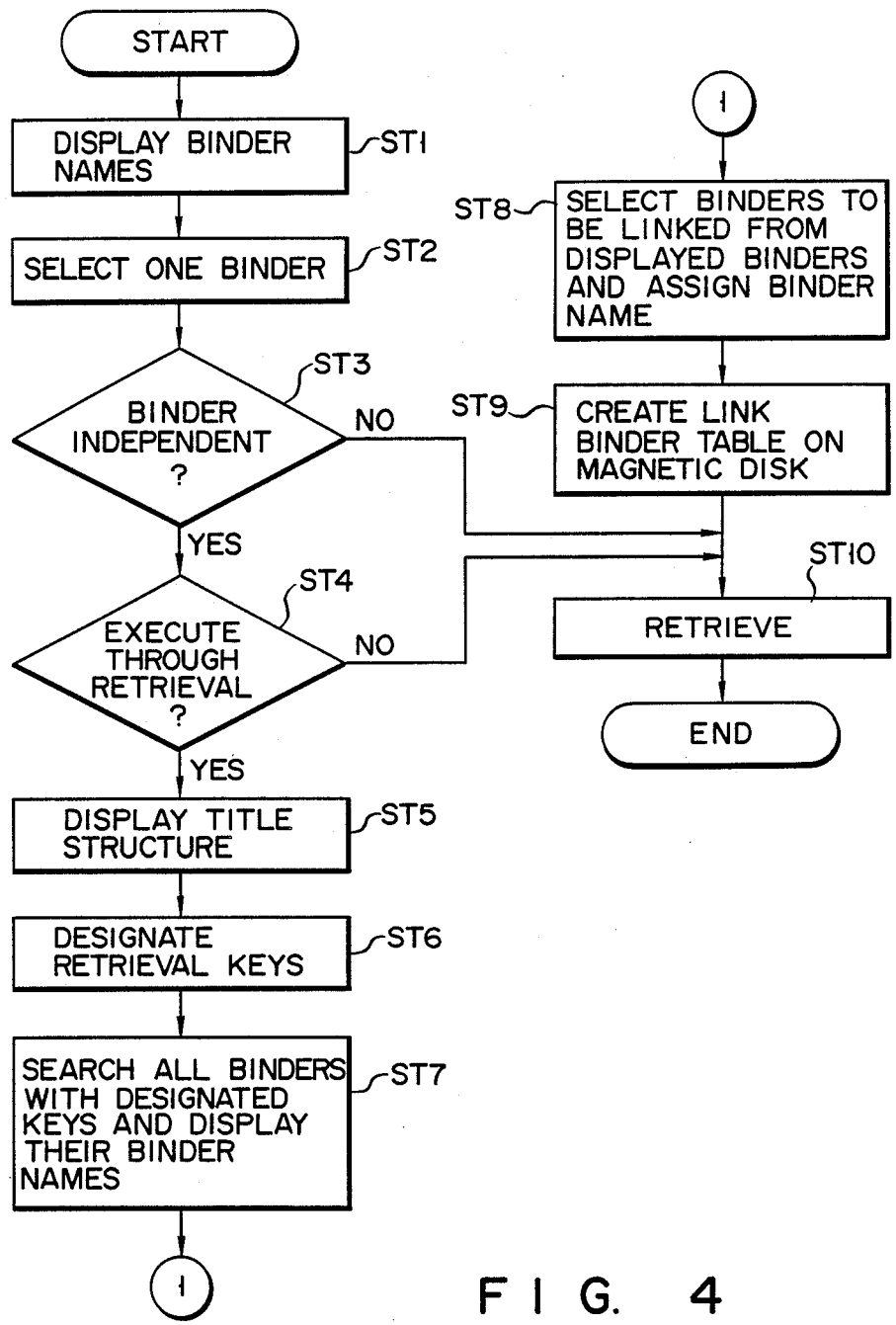
FIG. 4 is a flowchart for explaining the operation of the image information retrieval apparatus of this invention.
Figure 5:
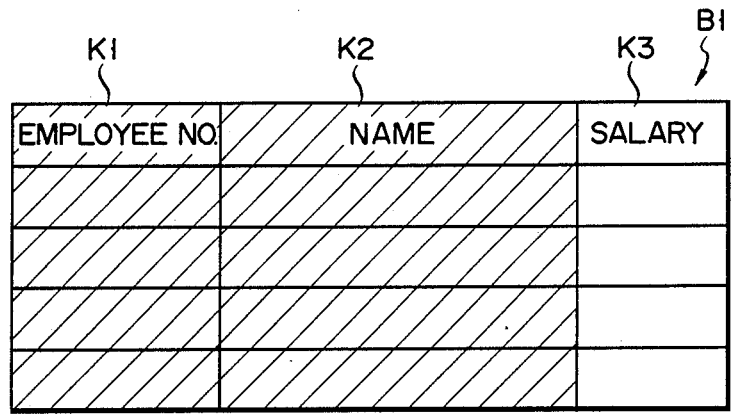
FIGS. 5 through 7 are diagrams exemplifying title tables used to explain the operation of the image information retrieval apparatus of this invention.
Figure 6:
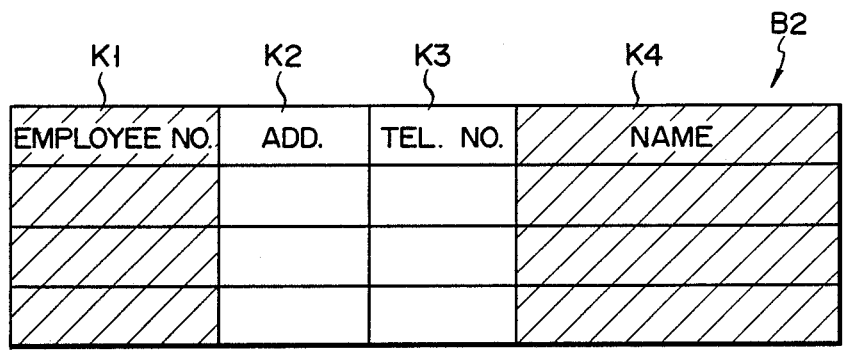
Figure 7:
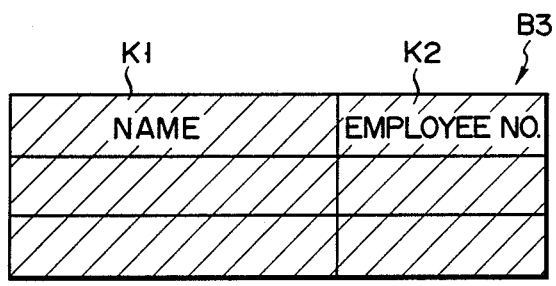

Referring now to FIG. 4, the operation of CPU 12 will be explained below. Assume that binder table Bt on magnetic disk 28 includes the first, second, and third binders B1-B3, which have different title structures and are independent, as is shown in FIGS. 5 to 7. First binder B1, shown in FIG. 5, includes first to third keys K1-K3, first key K1 being "Employee Number", second key K2 being "Name", and third key K3 being "Salary". Second binder B2, shown in FIG. 6, includes first to fourth keys K1-K4, first key K1 being "Employee Number", second key K2 being "Address", third key K3 being "Telephone Number", and fourth key being "Name". Third binder B3, shown in FIG. 7, includes first and second keys K1 and K2, first key K1 being "Name" and second key K2 being "Employee Number".

In step ST1, binder names Bna and binder numbers Bn are retrieved from binder table Bt stored on magnetic disk 28 and are displayed on CRT display apparatus 24. Referring to the displayed binder names, an operator designates a single binder in step ST2. Then, the flow advances to step ST3 where it is determined whether or not the selected binder is independent. Assuming that binder B1 has been selected in step ST2, then, since it is an independent binder, the flow advances to step ST4.

In step ST4, the operator is queried, using CRT display apparatus 24, whether or not to execute a binder through retrieval and it is determined whether or not the binder through retrieval is selected by the operator. If the binder through retrieval has been selected, the flow advances to step ST5 where the title structure definition table, which is associated with binder B1 having the title table of FIG. 5, is read out from binder table Bt stored on magnetic disk 28 and is displayed on CRT display apparatus 24.

In the subsequent step ST6, the operator refers to the displayed title structure definition table and designates retrieval keys. If, for example, an employee number K1 and an employee name K2 are selected by the operator, all the title structure definition tables of binder table Bt on magnetic disk 28 are searched for binders which have the same key attributes (i.e., key name Kna, key type Kt and key length Kl) as the selected employee number K1 and employee name K2, and the names of these binders are displayed on CRT display apparatus 24 in step ST7. In this embodiment, therefore, binders B1, B2, and B3 are displayed.

Figure 8:
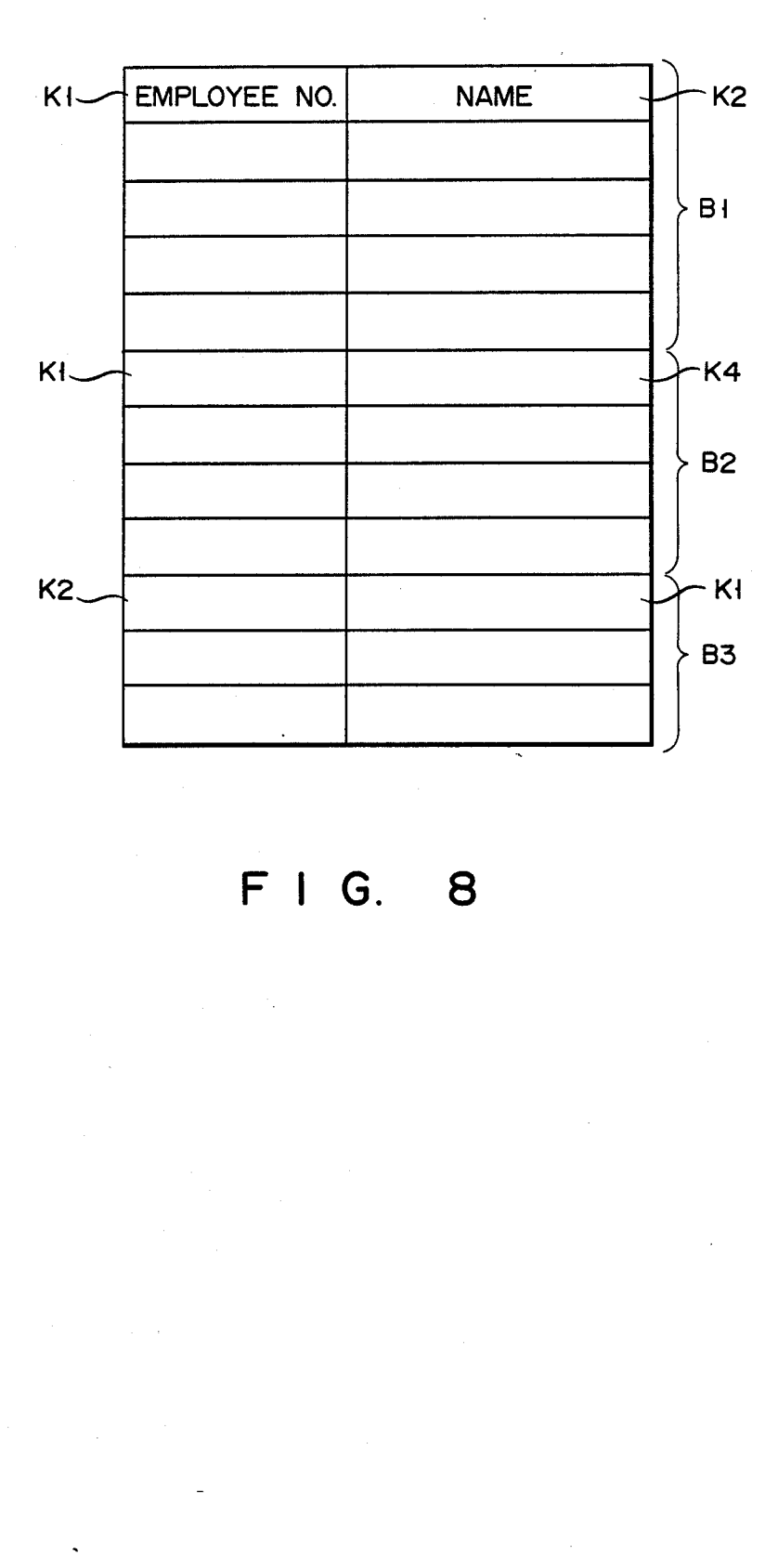

In the next step ST8, the operator is requested to select the binders to be linked, and to assign the name of a link binder to be prepared. If, for example, a binder C is designated as the name of the newly-created link binder and all of the displayed binders are to be linked together, then a link binder table is created on magnetic disk 28 in step ST9. More specifically, the binder C is registered first in binder table Bt on magnetic disk 28 and the title table of the link binder as shown in FIG. 8 is created on the magnetic disk.

This title table is prepared as follows. All the keys having the same attributes as the designated keys K1 and K2, i.e., those hatched in FIGS. 5-7, are extracted from binders B1-B3. Then, the individual keys are sequentially inserted in binder C in the orders they are extracted from binders B1-B3, thus creating the title table for the link binder (FIG. 8) on magnetic disk 28.

When the title table for the link binder is thus created, image information retrieval is executed using keys K1, K2, and K4 of binder C in step ST10. Accordingly, it is possible to perform the binder through retrieval between binders with different title structures.

If the selected binder is not independent in step ST3 or a binder through retrieval is not selected in step ST4, the flow advances to step ST10 to execute a direct retrieval operation.

As has been described above, according to this embodiment, only the keys having the same attributes as the designated key or keys are extracted from the title tables to create the title table for the link binder. With the use of this title table, therefore, it is possible to execute a through retrieval of binders having different title structures, thus significantly improving the retrieval efficiency as compared with the conventional through retrieval technique.

In the above embodiment, a title table is a heap structure in which titles are simply arranged in a sequential order. However, this invention is not limited to this type; the title table may have an ISAM structure or a hash structure, thus realizing a high speed retrieval.

"ISAM" is an abbreviation for "indexed sequential access method". In sequential retrieving indexed records, the order of record processing depends on the collating sequence of key values within the index (primary or alternate) being used for access. One system simply reads one record via the first key in the index, turns the corresponding data over to the application program, then reads the next record via the next key in the index, and so on. Thus, sequential access is provided, even through the system is accessing the data in a physically random order. This method of retrieval is commonly called the indexed sequential access method (ISAM).

In the hash structure, the title is stored in a location within a table, the location being calculated in accordance with a hashing function, which is a non-linear algorithm.

Further, in the above embodiment, a new title table is created on magnetic disk 28 by using only the keys having the same attributes as the selected key or keys. However, such a title table may also be created virtually, not physically.

Figure 9:
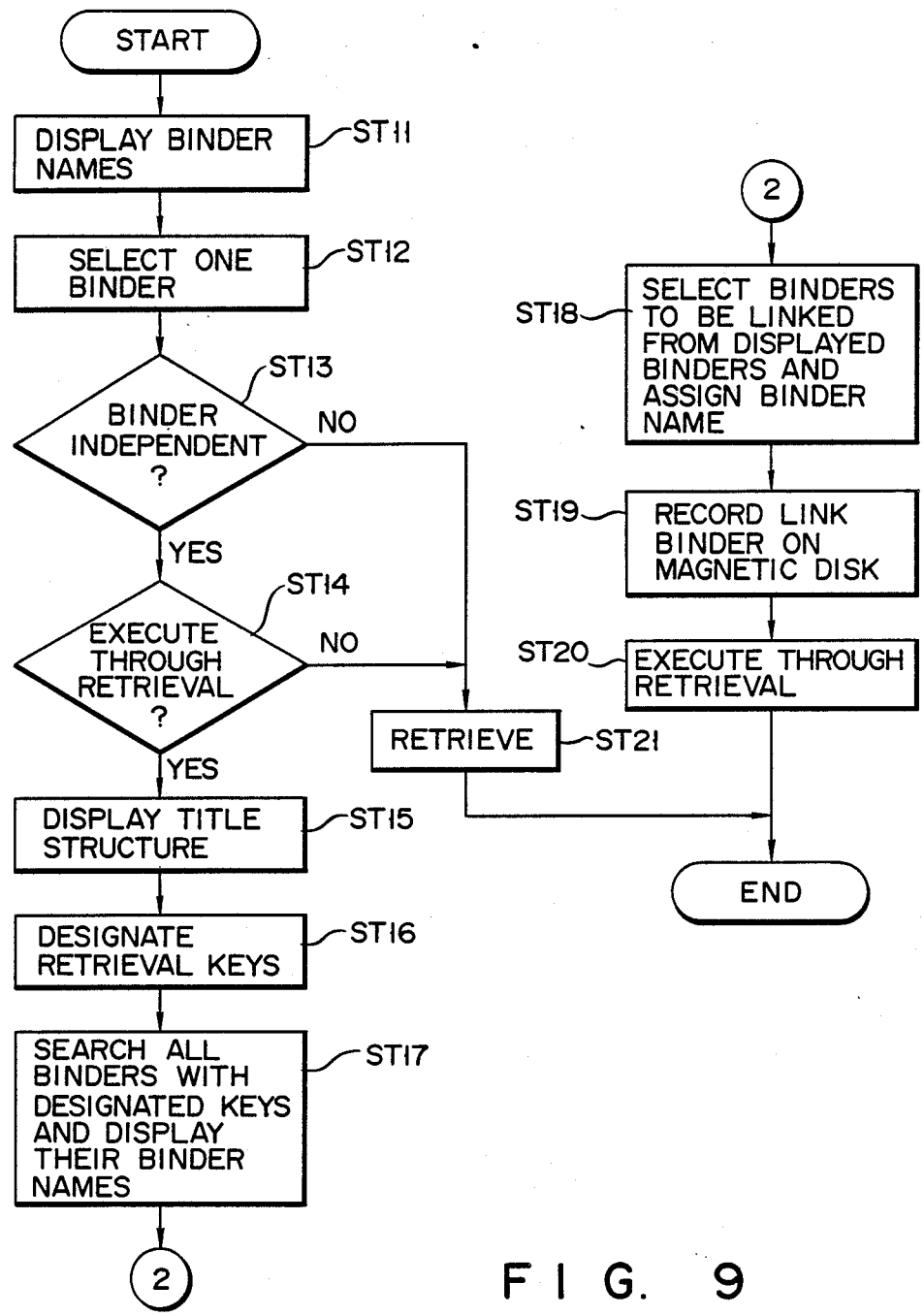
FIG. 9 is a flowchart for explaining the operation of an image information retrieval apparatus according to another embodiment of this invention.

FIG. 9 illustrates a flowchart for explaining the operation of the modified embodiment. In this explanation, as is the case in the first embodiment, it is assumed that binder table Bt on magnetic disk 28 includes the first, second, and third binders B1–B3, which have different title structures and are independent, as is shown in FIGS. 5 to 7.

In step ST11, binder names Bna and binder numbers Bn are retrieved from binder table Bt stored on magnetic disk 28 and are displayed on CRT display apparatus 24. Referring to the displayed binder names, an operator designates a single binder in step ST12. Then, the flow advances to step ST13 where it is determined whether or not the selected binder is independent. Assuming that binder B1 has been selected in step ST12, then, since it is an independent binder, the flow advances to step ST14.

In step ST14, the operator is queried, on CRT display apparatus 24, whether or not to execute a binder through retrieval and it is determined whether or not the binder through retrieval is selected by the operator. If the binder through retrieval has been selected, the flow advances to step ST15 where the title structure definition table, which is associated with binder B1 having the title table of FIG. 5, is read out from binder table Bt stored on magnetic disk 28 and is displayed on CRT display apparatus 24.

In the subsequent step ST16, the operator refers to the displayed title structure definition table and designates retrieval keys. If, for example, an employee number K1 and an employee name K2 are selected by the operator, all the title structure definition tables of binder table Bt on magnetic disk 28 are searched for binders that have the same key attributes (i.e., key name Kna, key type Kt and key length Kl) as the selected employee number K1 and employee name K2, and the names of these binders are displayed on CRT display apparatus 24 in step ST17. In this embodiment, therefore, binders B1, B2, and B3 are displayed.

In the next step ST18, the operator is requested to select the binders to be linked, and to assign the name of a link binder to be prepared. If, for example, a binder C is designated as the name of the newly-created link binder and all of the displayed binders are to be linked together, then a link binder table is created on magnetic disk 28 in step ST19.

Figures 10, 11:
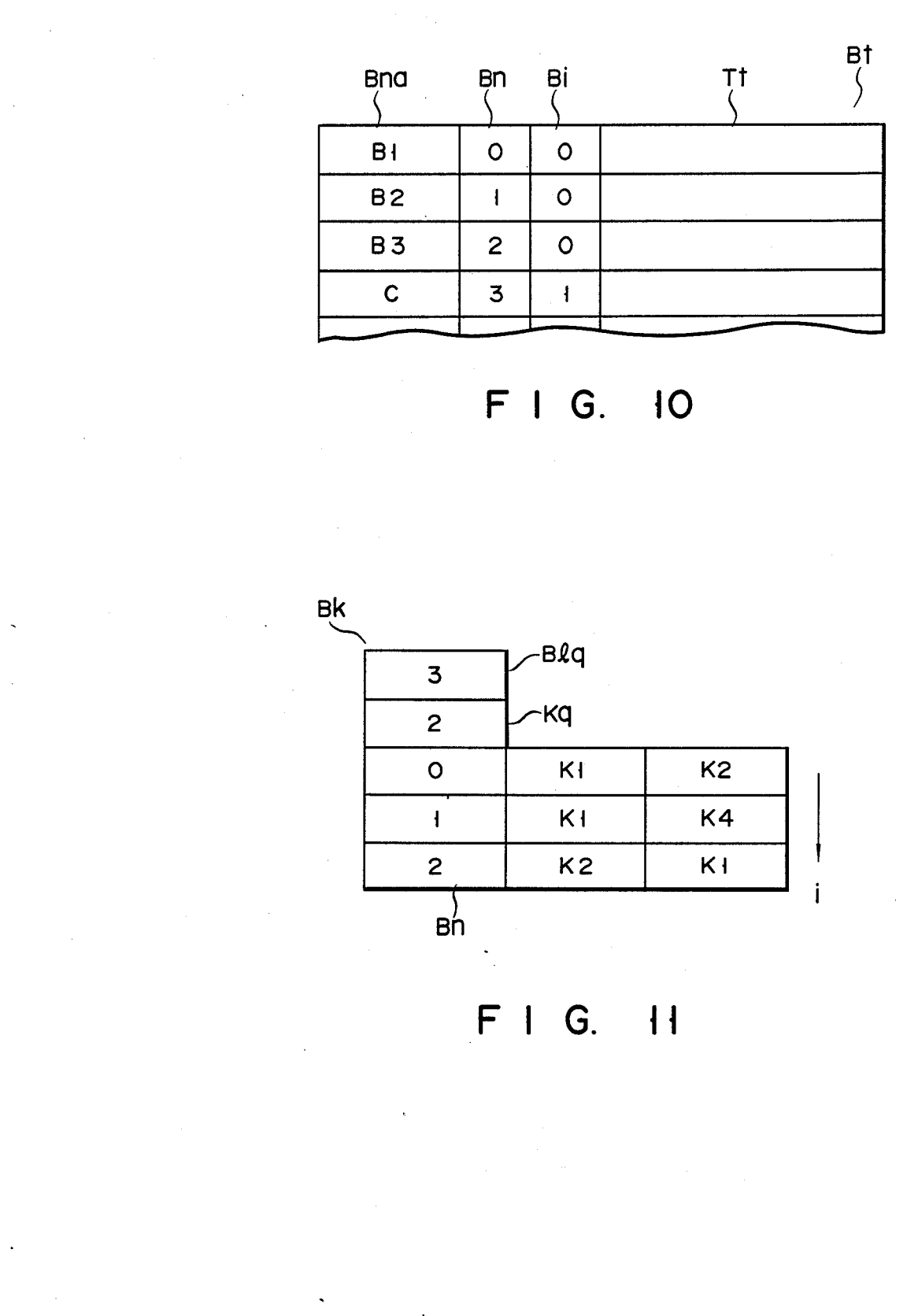

More specifically, the binder C is registered in binder table Bt on magnetic disk 28, as is shown in FIG. 10, with a binder number/key correlation table Bk registered as the title structure of binder C, as is shown in FIG. 11. This correlation table Bk includes a binder quantity Blq indicating the number of linked binders, a key quantity Kq, a binder number Bn for each binder and information of linked keys for each of the linked binders. The order of the keys coincides with that of keys 1 and 2 of the link binder.

When the link binder is registered on magnetic disk 28 in the above manner, retrieval of the link binder is carried out in step ST20. The link binder in this embodiment is an imaginary type, i.e., a virtual binder which does not have the actual or physical title table shown in FIG. 8. Therefore, the title tables (see FIGS. 5 to 7) of the individual independent binders are actually retrieved. FIG. 12 is a flowchart for explaining this retrieval operation.

In the flowchart of FIG. 12, a variable i denotes the vertical position of each item in binder number/key correlation table Bk shown in FIG. 11.

First, in step ST31, binder quantity Blq is extracted from the binder number/key correlation table Bk and stored in a memory area n. The variable i indicating the vertical position is set to an initial value of "0" in step ST32. The content of a binder number (i), i.e., "0", is stored in a memory area b in step ST33, and the content of a key number (i, 1), i.e., "K1" is stored to a key x in step ST34. In the subsequent step ST35, the content of a key number (i, 2), (i.e., "K2" is stored to a key y. The flow then advances to step ST36 where a target binder is retrieved using the binder number and the key numbers which have been set in previous steps ST33–35.

Then, the binder quantity is decremented in step ST37 followed by step ST38, where it is determined whether or not retrieval of all the binders is completed. If the determination in step ST38 is negative, the flow advances to step ST39 to increment the binder number and then returns to step ST33. If it is judged in step ST38 that all the binders are retrieved, the retrieval operation completes.

If the selected binder is judged to be independent in step ST13 and it is judged in the subsequent step ST14 that no binder through retrieval is to be executed, the flow advances to step ST21 so that a direct retrieval operation would be carried out in step ST21.

The above-explained retrieval operation illustrated in FIG. 12 is executed using the binder number/key correlation table shown in FIG. 11. Therefore, only two key setting steps (ST34 and ST35) are illustrated. An actual retrieval operation requires n steps for the key setting to cope with the quantity Kq of the actual keys.

According to the aforementioned second embodiment, the binder number/key correlation table Bk is created using the numbers and key numbers of the binders to be linked and an imaginary, i.e., a virtual link binder is created using this correlation table Bk. Therefore, the use of the correlation table Bk ensures a through retrieval of binders having different title structures without actually creating the title table of the link binder.

This embodiment can also cope with updating of the title table of an independent binder, such as data addition, deletion, and modification, and can, therefore, ensure image information retrieval in of even the most recently updated information. This feature is effective in a practical operation.

The present invention is not limited to the aforementioned embodiments and this can be modified in various manners without departing from the scope of the invention.

As should be clear from the above description, this invention can provide an image information retrieval apparatus that can perform a through retrieval of binders having different title structures, thus improving the retrieval efficiency.

What is claimed is:

1. An information retrieval apparatus comprising:
    information groups storage means for storing a plurality of information groups, each of said information groups including a plurality of information units storing information;
    title structure storage means for storing a plurality of title structure items, each title structure item corresponding to one information group, each title structure item having a format different from other title structure items corresponding to other information groups and each title structure item having a plurality of retrieval keys for retrieving information from said information groups storage means, each of said plurality of retrieval keys having attribute data which include a name of said retrieval key, at least one of said plurality of retrieval keys belonging to a plurality of retrieval keys of more than one title structure item;
    designation means for designating a desired retrieval key corresponding to information to be retrieved, said desired retrieval key belonging to a plurality of retrieval keys of more than one title structure item;
    extraction means for extracting, from said title structure items, retrieval keys having attribute data identical to that of the desired retrieval key designated by said designation means; and
    retrieval means for enabling retrieval of information from said information groups storage means by using said extracted retrieval keys, thereby enabling retrieval of information from said information groups corresponding to a plurality of title structure items having a plurality of retrieval keys including said desired retrieval key.

2. The information retrieval apparatus according to claim 1, wherein
    said title structure storage means includes means for storing a plurality of title tables, each of said title tables corresponding to one information group and including a plurality of title data items, each of said title data items having a structure defined by one of said title structure items, being stored with correspondence to one of said retrieval keys of the defining title structure item, and corresponding to said information stored in said information groups storage means,
    wherein said extraction means includes means for preparing a new title table including said title data items which correspond to said extracted retrieval keys and are stored in said title table storage means, and
    wherein said retrieval means includes means for retrieving information from said information groups storage means responsive to said new title table.

3. The information retrieval apparatus according to claim 2, wherein said preparation means includes:
    key-extracting means for extracting, from each of said title structure items, only those retrieval keys which have the same attribute data as said retrieval key designated by said designation means;
    means for extracting, from said title tables stored in said title table storage means, those portions of said title tables associated with said extracted retrieval keys; and
    means for sequentially storing said extracted portions of said title tables, so as to prepare said new title table.

4. The information retrieval apparatus according to claim 3, wherein said preparation means further includes:
    means for displaying information groups associated with said title structure items having retrieval keys having the same attribute data as said retrieval key designated by said designation means; and
    means for selecting desired information groups to be retrieved from among said displayed information groups, and
    wherein said key-extracting means includes means for extracting only those retrieval keys having the same attribute data as said designated retrieval key, from said title structure items associated with said selected information groups.

5. The information retrieval apparatus according to claim 2, wherein said preparation means includes:
    key-extracting means for extracting, when a plurality of retrieval keys are designated by said designation means, from each of said title structure items, only those retrieval keys having the same attribute data as said retrieval keys designated by said designation means;
    means for extracting, from said title tables stored in said title table storage means, those portions of said title tables associated with said extracted retrieval keys; and
    means for rearranging and storing said extracted portions of said title tables, so as to prepare said new title table.

6. The information retrieval apparatus according to claim 5, wherein said preparation means further includes:
    means for displaying those information groups associated with said title structure items having retrieval keys having the same attribute data as said retrieval keys designated by said designation means; and means for selecting desired information groups to be retrieved from among said displayed information groups, and wherein said key-extracting means includes means for extracting only those retrieval keys having the same attribute data as said designated retrieval keys from said title structure items associated with said selected information groups.

7. The information retrieval apparatus according to claim 1, wherein said title structure storage means comprises means for storing a plurality of title tables, each of said title tables corresponding to one of said plurality of information groups and including a plurality of title table data items, each of said title table data items having a structure defined by one of said title structure items, being stored with correspondence to said retrieval key, and corresponding to said information stored in said information groups storage means, wherein said extraction means includes means for preparing a group/key correlation table, said group/key correlation table including group data representing said information groups having said extracted retrieval keys and key data representing said retrieval keys, in a correlated information group, corresponding to said extracted retrieval keys, and wherein said retrieval means includes means for retrieving those correlated portions of said title tables stored in said title table storage means and indicated by said group/key correlation table, to retrieve information associated with said designated retrieval key from said information groups of said information groups storage means.

8. The information retrieval apparatus according to claim 7, wherein said preparation means includes:

key-extracting means for extracting, from said title structure items, only those retrieval keys having the same attribute data as said retrieval key designated by said designation means; and means for sequentially storing said extracted retrieval keys, to prepare said group/key correlation table.

9. The information retrieval apparatus according to claim 8, wherein said preparation means further includes:

means for displaying those information groups associated with said title structure items having retrieval keys having the same attribute data as said retrieval key designated by said designation means; and means for selecting desired information groups to be retrieved from among said displayed information groups;

wherein said key-extracting means includes means for extracting only those retrieval keys having the same attribute data as said desingated retrieval key, from said title structure items associated with said selected information groups.

10. The information retrieval apparatus according to claim 7, wherein said preparation means includes:

key-extracting means for extracting, when a plurality of retrieval keys are designated by said designation means, from each of said title structure items, only those retrieval keys having the same attribute data as said retrieval keys designated by said designation means; and means for rearranging said extracted retrieval keys in an order coinciding with the order of said designated retrieval keys to prepare said group/key correlation table, and wherein said retrieval means includes means for retrieving those correlated portions of said title tables indicated by said group/key correlation table, to retrieve information associated with said designated retrieval keys.

11. The information retrieval apparatus according to claim 10, wherein said preparation means further includes:

means for displaying those information groups associated with said title structure items having retrieval keys having the same attribute data as said retrieval keys designated by said designation means; and means for selecting desired information groups to be retrieved from among said displayed information groups, and wherein said key-extracting means includes means for extracting only those retrieval keys having the same attribute data as said designated retrieval keys from said title structure items associated with said selected information groups.

12. An information retrieval apparatus comprising:

a first storage medium for storing a plurality of information groups, each of said information groups including a plurality of information units, each of said information units storing information;

a second storage medium for storing title structures and a plurality of title tables, each of said title structures corresponding to an information group and having a format different from formats of other title structures, and each format including a plurality of retrieval keys for retrieving information from said first storage medium, each of said plurality of retrieval keys having attribute data including a name of said retrieval key, at least one of said plurality of retrieval keys belonging to a plurality of retrieval keys of more than one title structure, each of said title tables corresponding to a respective information group and including a plurality of title data, each of said title data having a structure defined by one of said title structures being stored with correspondence to said retrieval key, and corresponding to said information stored in said first storage medium;

designation means for designating at least one desired retrieval key corresponding to information to be retrieved; and control means for extracting, from said title structures stored on said second storage medium, retrieval keys having attribute data identical to that of said at least one retrieval key designated by said designation means to provide a new title table, and for retrieving information from said information groups of said first storage medium, by using said new title table, thereby retrieving information from said information groups corresponding to title structures of differing formats.

13. The information retrieval apparatus according to claim 12, wherein said control means includes:

key-extracting means for extracting, from each of said title structures, only those retrieval keys having the same attribute data as said at least one retrieval key designated by said designation means;

means for extracting, from said title tables stored in said second storage medium, those portions of said title tables associated with said extracted retrieval keys; and means for sequentially storing said extracted portions of said title tables to prepare said new title table.

14. The information retrieval apparatus according to claim 13, further comprising:
   means for displaying those information groups associated with said title structures having retrieval keys having the same attribute data as said at least one retrieval key designated by said designation means; and
   means for selecting desired information groups to be retrieved from among said displayed information groups, and
   wherein said key-extracting means includes means for extracting only those retrieval keys having the same attribute data as said at least one designated retrieval key, from said title structures associated with said selected information groups.

15. An information retrieval apparatus comprising:
   first storage means for storing a plurality of information groups, each of said information groups including a plurality of information units, each of said information units storing information;
   second storage means for storing title structures and a plurality of title tables, each of said title structures corresponding to one of said plurality of information groups, having a format different from other title structures corresponding to other information groups, and having a plurality of retrieval keys for retrieving information from said first storage means, each said retrieval key having attribute data including a name of said retrieval key each of said title tables corresponding to each information group, including a plurality of title data, each of said title data having a structure defined by one of said title structures, being stored with correspondence to said retrieval key, and corresponding to said information stored in said first storage means;
   designation means for designating at least one desired retrieval key corresponding to information to be retrieved;
   extraction means for extracting, from said title structures, retrieval keys having attribute data identical to said at least one retrieval key designated by said designation means;
   preparation means for preparing a group/key correlation table, said group/key correlation table including group data representing said information groups having said extracted retrieval keys and key data representing said retrieval keys, in a correlated information group, corresponding to said extracted retrieval keys; and
   retrieval means for retrieving information from said information groups of said first storage means, by using said group/key correlation table thereby retrieving information from said information groups corresponding to title structures of differing formats.

16. The information retrieval apparatus according to claim 15, wherein said retrieval means includes means for retrieving those correlated portions of said title tables stored in said second storage means and indicated by said group/key correlation table, to retrieve information associated with said at least one designated retrieval key from said information groups of said first storage means.

17. The information retrieval apparatus according to claim 16, wherein said preparation means further includes:
   key-extracting means for extracting, from said title structures, only those retrieval keys having the same attribute data as said at least one retrieval key designated by said designation means; and
   means for sequentially storing said extracted retrieval keys, to prepare said group/key correlation table.

18. The information retrieval apparatus according to claim 17, further comprising:
   means for displaying those information groups associated with said title structures having retrieval keys having the same attribute data as said at least one retrieval key designated by said designation means; and
   means for selecting desired information groups to be retrieved from among said displayed information groups;
   wherein said key-extracting means includes means for extracting only those retrieval keys having the same attribute data as said at least one designated retrieval key, from said title structures associated with said selected information groups.

* * * * *